C. A. CHAMBERLIN,

Assignor, by mesne assignments, to the AMERICAN CHAIN Co., Limited.

Link for Chains.

No. 8,761. Reissued June 17, 1879.

Witnesses:

A. P. Grant,

H. F. Kücher

Inventor:

C. A. Chamberlin, by John A. Wiedersheim

ATTORNEY.

N. PETERS, PHOTO-LITHOGRAPHER, WASHINGTON, D. C.

UNITED STATES PATENT OFFICE.

CHARLES A. CHAMBERLIN, OF CAMDEN, NEW JERSEY, ASSIGNOR, BY MESNE ASSIGNMENTS, TO THE AMERICAN CHAIN COMPANY, (LIMITED.)

IMPROVEMENT IN LINKS FOR CHAINS.

Specification forming part of Letters Patent No. 165,541, dated July 13, 1875; Reissue No. 8,761, dated June 17, 1879; application filed March 10, 1879.

*To all whom it may concern:*

Be it known that I, CHARLES A. CHAMBERLIN, of the city and county of Camden, and State of New Jersey, have invented a new and useful Improvement in Links for Chains and other Purposes, which improvement is fully set forth in the following specification and accompanying drawings, in which—

Figure 1:
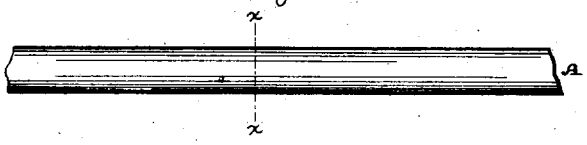
Figure 2:
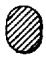
Figure 3:
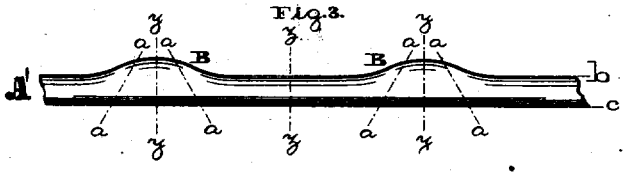
Figure 5:
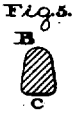
Figure 6:
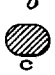
Figure 4:
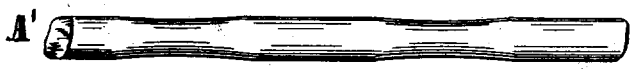
Figure 7:
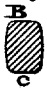
Figure 10:
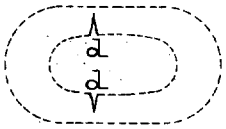
Figure 11:
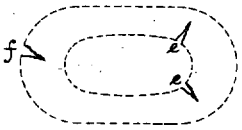
Figure 8:
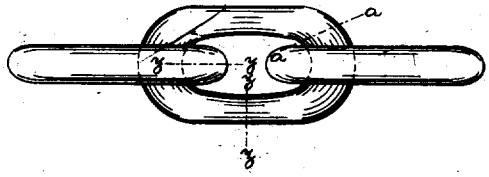
Figure 9:
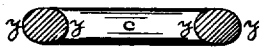

Figure 1 is a side view of the bar from which the blank is produced. Fig. 2 is a transverse section thereof in line *x x*, Fig. 1. Figs. 3 and 4 are side views of the blank from which the links are constructed. Fig. 5 is a transverse section in line *y y*, Fig. 3. Fig. 6 is a transverse section in line *z z*, Fig. 3. Fig. 7 is a transverse section in line *a a*, Fig. 3. Fig. 8 is a view of a portion of a chain the links whereof embody my invention. Fig. 9 is a longitudinal section of a link. Figs. 10 and 11 are diagrams, to be hereinafter referred to.

Similar letters of reference indicate corresponding parts in the several figures.

My invention consists of a link-blank the contour of which is such as to form links with flattened bends containing a greater area in cross-section than the sides of the link.

It also consists in extending or carrying the broad sides of the link to points at the junction of the sides and bends, and in extending or carrying the bend-swells up to or beyond said junction toward the center of the sides, so that the depth of the link at said points is greater than the thickness, whereby provision is made to prevent fracture thereat.

It further consists of a link having flattened bends of greater depth in the line of strain.

It also consists in forming a link of increased depth at the points of junction of the sides and bends and flattened at said points, and of increased depth in the bends in the line of strain.

It also consists in forming the inner face of a link broader than the usual circular form would give, and of increased depth at the points of junction of the sides and bends, and flattened at those points.

It also consists in forming the inner face of the link broader than the usual circular form would give, and the bends of increased depth.

It further consists of the link formed with broad inner sides, increased depth at or about the points of junction of the sides and bends, and increased depth in the longitudinal direction of said bends, whereby the link when in use is enabled to withstand the several strains to which it is subjected.

Referring to the drawings, A represents a bar, which is rolled in elliptical form, as seen in cross-section, Fig. 2. The bar is rerolled, so as to produce on one of its sides, *b*, at certain intervals, swells B B, the contour of which, in cross-section, *y y*, is the figure shown in Fig. 5; but the elliptical form of the remainder is preserved, as shown in Fig. 6, which is a section in line *z z*, but with the axis reversed. The broad side or face *c* also extends to the points at or about the junction of the swells and adjacent portions of the bar, so that at said points, as in lines *a a*, there is an increased depth of metal.

When the bar is bent into shape the swells B occupy positions at the ends or bends of the link, said ends or bends thus having increased depth longitudinally, as in the line *y y*, said swells reaching beyond or overlapping the points of junction of the sides and bends, so as to give increased depth in the lines *a a*.

It will be seen that, owing to the elliptical shape of the blank A′, said bar, when bent into shape, presents an inner face, *c*, broader than a circular form would give, whereby the broad side or face *c* resists the tearing action or fracture to which it is subjected on its inner side, such action or fracture being shown at *d*, Fig. 10. The tendency to fracture at the points of junction between the sides and bends, as shown at *e e*, Fig. 11, is resisted by the increased depth of the metal in the lines *a a* and its flattened form, which lines are near the points at which the fractures *e e* generally occur. The tendency to fracture on the outside of the bend—say at *f*—due to sudden jerks or strain, is resisted by the increased depth of metal in the line *y y*.

In making comparison, I employ as a basis the sides of an ordinary link of round iron of equal area in cross-section. By depth I mean the direction of the plane of greatest breadth of the link, and by thickness the direction perpendicular to the depth.

I do not claim, broadly, greater depth in the bends.

Having thus described my invention, what I claim as new, and desire to secure by Letters Patent, is—

1. The link-blank A′, consisting of a bar with swells B B at intervals, substantially as and for the purpose set forth.

2. A link with increased depth at the points of junction of the sides and bends and flattened at those points, so that the depth is greater than the thickness, substantially as and for the purpose set forth.

3. A link with flattened bends of increased depth in the line of strain.

4. A link constructed with increased depth at the points of junction of the sides and bends, as at *a a*, and flattened at said points, and increased in depth in the bends in the line of strain, as at *y y*, said bends being likewise flattened, substantially as and for the purpose set forth.

5. A link having side bars with broad inner faces, *c*, and of increased depth at the points of junction of the sides and bends, as at *a a*, and flattened at said points, substantially as and for the purpose set forth.

6. A link having side bars with broad inner faces, *c*, and flattened bends of increased depth in the line of strain, as at *y y*, substantially as and for the purpose set forth.

7. A link elliptical on its inner face, as at *c*, increased in depth at or about the points of junction of the sides and bends, as at *a a*, and increased in depth at the bends, as at *y y*, substantially as and for the purpose set forth.

C. A. CHAMBERLIN.

Witnesses:

JOHN A. WIEDERSHEIM,

H. E. GARSED.